(12) United States Patent
Sugaya

(10) Patent No.: US 11,916,961 B2
(45) Date of Patent: Feb. 27, 2024

(54) COMPUTER SYSTEM, SECURITY SETTING SUGGESTION METHOD, AND PROGRAM

(71) Applicant: OPTIM CORPORATION, Saga (JP)

(72) Inventor: Shunji Sugaya, Saga (JP)

(73) Assignee: OPTIM CORPORATION, Saga (JP)

( * ) Notice: Subject to any disclaimer, the term of this patent is extended or adjusted under 35 U.S.C. 154(b) by 968 days.

(21) Appl. No.: 16/651,596

(22) PCT Filed: Sep. 28, 2017

(86) PCT No.: PCT/JP2017/035309
§ 371 (c)(1),
(2) Date: May 28, 2020

(87) PCT Pub. No.: WO2019/064458
PCT Pub. Date: Apr. 4, 2019

(65) Prior Publication Data
US 2022/0353294 A1 Nov. 3, 2022

(51) Int. Cl.
*H04L 9/40* (2022.01)
(52) U.S. Cl.
CPC ............ *H04L 63/20* (2013.01); *H04L 63/102* (2013.01); *H04L 63/105* (2013.01)
(58) Field of Classification Search
CPC ...... H04L 63/20; H04L 63/102; H04L 63/105
USPC .......................................................... 726/1
See application file for complete search history.

(56) References Cited

U.S. PATENT DOCUMENTS

| | | | |
|---|---|---|---|
| 2012/0095956 A1* | 4/2012 | Xiong | G06Q 10/10 707/758 |
| 2012/0226623 A1* | 9/2012 | Jurney | G06Q 10/105 705/321 |
| 2016/0344544 A1 | 11/2016 | Biesinger et al. | |
| 2019/0199731 A1* | 6/2019 | Park | H04L 63/102 |

FOREIGN PATENT DOCUMENTS

| | | |
|---|---|---|
| CN | 105516054 A | 4/2016 |
| JP | 2002-222193 A | 8/2002 |
| JP | 2003316650 A | 11/2003 |
| JP | 2014-238675 A | 12/2014 |

OTHER PUBLICATIONS

International Search Report issued in PCT/JP2017/035309 dated Dec. 26, 2017.

* cited by examiner

*Primary Examiner* — Anthony D Brown
(74) *Attorney, Agent, or Firm* — Norton Rose Fulbright US LLP; James R. Crawford

(57) ABSTRACT

Provided are a computer system which suggests an appropriate security set to a user for user information and statistical information related to collected statistical security parameters, a security setting suggestion method, and a program. The computer system, which is arranged in communication connection to at least one user terminal (10) and which is provided with a security statistics database (250), acquires, from the user terminal (10), a suggestion request for a security set, and user information at least including an attribute, uses the suggestion request and the acquired user information to extract, from the security setting statistics database (250), a security set associated with user information which is identical to the acquired user information or similar to the acquired user information within a specific (Continued)

extent, and provides the user terminal (10) with at least one extracted security set as a suggested security set.

5 Claims, 6 Drawing Sheets

Security Set Table

| Security Set Name | Use time limit | Internet limit | Telephone limit | Mail limit | GPS tracking |
|---|---|---|---|---|---|
| Security Set A | ○ | ○ | × | ○ | ○ |
| Security Set B | ○ | ○ | × | × | ○ |
| Security Set C | × | ○ | × | × | × |
| ... | ... | ... | ... | ... | ... |

FIG. 6

Security Set Statistics Table

| Used Security Set Name | Attribute | Question Item A | Question Item B |
|---|---|---|---|
| Security Set A | 1 | ○ | ○ |
| Security Set A | 1 | × | × |
| Security Set B | 5 | ○ | × |
| Security Set A | 3 | ○ | ○ |
| Security Set B | 4 | ○ | × |
| Security Set C | 10 | ○ | ○ |
| Security Set C | 11 | ○ | × |
| Security Set A | 2 | × | ○ |
| Security Set C | 12 | ○ | ○ |
| ... | ... | ... | ... |

FIG. 7

COMPUTER SYSTEM, SECURITY SETTING SUGGESTION METHOD, AND PROGRAM

CROSS-REFERENCE TO RELATED APPLICATIONS

This application is a national phase under 35 U.S.C. § 371 of International Application No. PCT/JP2017/035309 filed Sep. 28, 2017, which is hereby incorporated by reference in its entirety.

TECHNICAL FIELD

The present disclosure relates to a computer system which suggests an appropriate security set on the basis of user information, a security setting suggestion method, and a program.

BACKGROUND

In recent years, various services are provided to a user by connecting a portable terminal connected to a public line network to a Web server or the like. In particular, with the advent of smartphones (mobile phones having advanced functions), advanced services which were early performed on a personal computer can be provided by means of a mobile phone.

However, with the popularization of user terminals, cases is increasing in which users who are not sophisticated in the Internet can process information related to services on their own terminals. As a result of giving such a user unlimited access to the Internet, harmful content may be sometimes provided, or user information may be leaked.

Therefore, in such a user terminal, it is necessary to set appropriate security according to a user who is using the terminal, thereby avoiding danger without impairing convenience as much as possible.

In view of the above, a method of automatically filtering harmful information by using collaborative filtering is disclosed.

LITERATURE IN THE RELATED ART

Patent Literature

Patent Literature 1: Japanese Patent Publication No. 2002-222193

SUMMARY

In the method disclosed in Patent Literature 1, text information is extracted from Internet information to be imported into a browser, and an input sentence vector Q is created. The similarity degree or correlation coefficient of each learning information vector in a pre-registered learning information vector group 30 is calculated, and a learning information vector group having a high similarity degree or correlation coefficient is extracted. Then, an extended target word is selected according to scores of words included in the extracted learning information vector group, and an extended input sentence vector Qnew is created for the original input sentence vector. Then, through the use of the extended input sentence vector, it is determined whether the Internet information to be acquired is inappropriate information, and if it is inappropriate information, the import of this information is prevented.

However, although this method can automatically provide an effective filtering function, the filtering results are the same when the learning information vector group is the same, so that the criteria for filtering cannot be modified according to the attribute of the user. In addition, since this disclosure is based only on the filtering of the text information, effective security cannot be set for the telephone function, GPS function, paying function and other functions of the user terminal 10.

In view of the above, the object of the present disclosure is to provide a computer system which suggests an appropriate security set to a user on the basis of user information and statistical information related to collected statistical security parameters, a security setting suggestion method, and a program.

A first feature of the present disclosure is a computer system arranged in communication connection to one or more user terminals, and provided with a security statistics database. The computer system includes a suggestion request acquisition unit, configured to acquire, from the user terminal, a suggestion request for a security set, and user information at least including an attribute; a security set extraction unit, configured to extract, according to the suggestion request and the acquired user information, from the security set statistics database, a security set associated with user information which is identical to the acquired user information or similar to the acquired user information within a specific extent; and a suggested security set provision unit, configured to provide the user terminal with one or more extracted security sets as a suggested security set.

According to the first feature of the present disclosure, the computer system arranged in communication connection to one or more user terminals and provided with a security statistics database acquires, from the user terminal, a suggestion request for a security set and user information at least including an attribute, extracts, according to the suggestion request and the acquired user information, from the security set statistics database, a security set associated with user information which is identical to the acquired user information or similar to the acquired user information within a specific extent, and provides the user terminal with one or more extracted security sets as a suggested security set.

The disclosure related to the first feature belongs to the category of the computer system, but even the method and the program can also have the same effect and performance as the category.

Effects of the Present Disclosure

The present disclosure can provide a computer system which suggests an appropriate security set to a user on the basis of user information and statistical information related to collected statistical security parameters, a security setting suggestion method, and a program.

BRIEF DESCRIPTION OF DRAWINGS

FIG. 6 illustrates an example of a security set table in a security set statistics database 250.

FIG. 7 illustrates an example of a security set statistics table in the security set statistics database 250.

DETAILED DESCRIPTION

Optimal embodiments for implementing the present disclosure will be described below with reference to the drawings. It is to be noted that the embodiments are only examples and not intended to limit the scope of the present disclosure.

[Summary of the Security Setting Suggestion System 1]

Figure 1:
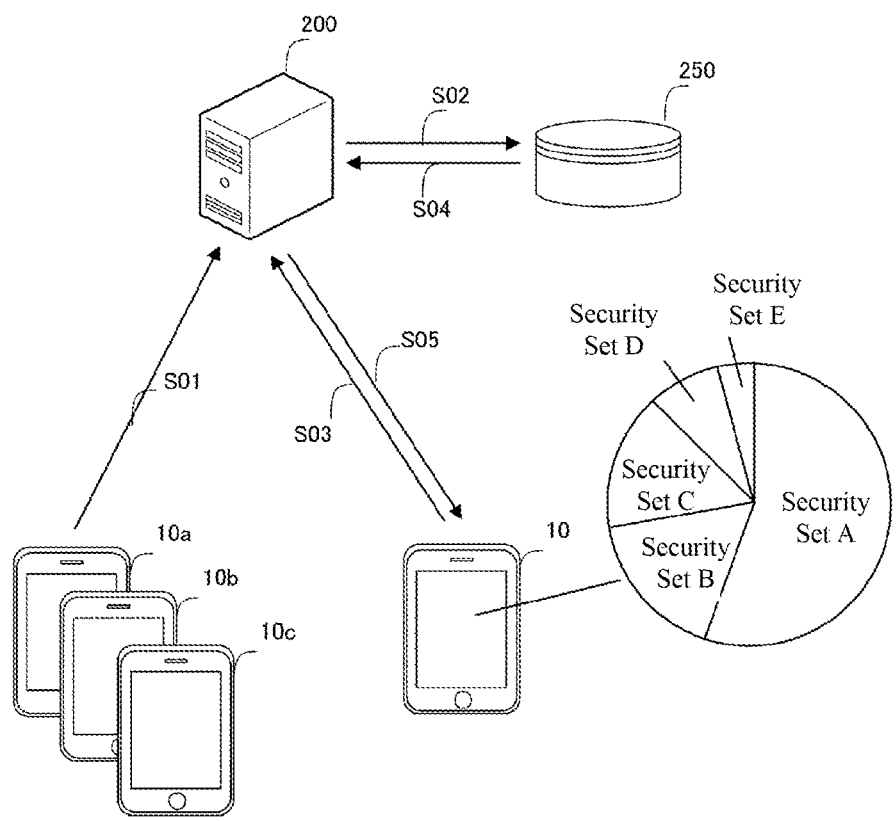
FIG. 1 is a view illustrating a security setting suggestion system 1 as an embodiment of the present disclosure.

FIG. 1 is a view illustrating the security setting suggestion system 1 as an embodiment of the present disclosure. Base on FIG. 1, the summary of the security setting suggestion system 1 is described below.

In the security setting suggestion system 1, a security setting suggestion server 200 may communicate with multiple user terminals 10. A terminal currently receiving a security setting suggestion is defined as the user terminal 10, and other user terminals 10 are defined as a user terminal 10a, a user terminal 10b, and a user terminal 10c for distinction.

First, the user terminal 10a, the user terminal 10b and the user terminal 10c send security sets currently used and user information to the security setting suggestion server 200 (step S01). The security set refers to a series of combinations of parameters used as security settings, such as a combination of parameters of settings of application place limit, Internet limit, telephone limit and use time limit of the user terminal 10. These parameters may be flags with two values of On and Off, or may be a specific value. The specific value, for example, may include: a value of a range of location information which is permitted to be used, a value of a domain of a website which is not permitted to be browsed, a value of a search word whose search results are not displayed, and a value of continuous use time related to the use time limit.

Second, the security setting suggestion server 200 associates the received security sets with the received user information, and stores them in a security set statistics database 250 provided in a storage section (step S02). The security set statistics database 250 is a database in which security sets in use are stored as statistical data according to each piece of user information. The security setting suggestion system 1 receives the security set and the user information from the user terminal 10, so as to obtain the security set and user information.

Then, the user terminal 10 receiving the suggestion of security sets this time sends the user information and a suggestion request to the security setting suggestion server 200 (step S05). The user information at least includes an attribute of a user, and may be a value of any variable from which the meaningful statistics can be obtained when a security set suitable for the user is provided. That is, the user information refers to demography information such as job-related information (position, title, use time period, and working years), instead of identifiers which can identify the user, such as the name or telephone number.

In addition, the user terminal 10 performs specified question items such as a questionnaire item as to whether the Internet limit is valid in the security set or a question for measuring (calculating) the user's understanding degree of the Internet, and includes the results in the user information, so as to obtain more appropriate security set statistics according to the user's needs and understanding degree.

The security setting suggestion server 200, upon receiving the suggestion request, extracts statistical information according to the suggestion request as well as the received user information (step S04). The security setting suggestion system 1 receives the suggestion request from the user terminal 10, so as to obtain the suggestion request. Then based on the result, a suggested security set is generated, and the suggested security set is sent to the user terminal 10 which sends the suggestion request (step S05). The security setting suggestion system 1 sends the suggested security set from the security setting suggestion server 200 to the user terminal 10, so as to provide the suggested security set.

As shown in FIG. 1, for the suggested security set, the simplest one is to directly send statistical information of usage rates of multiple security sets as a pie chart. The user can view the chart and details of the security sets while selecting an appropriate security set.

In addition, only up to one security set is sent at the beginning, after this security set is set on the user terminal 10, the user may individually customize the security set or reflect the request for answering the question item. The above is the summary of the security setting suggestion system 1.

[System Composition of the Security Setting Suggestion System]

Figure 2:
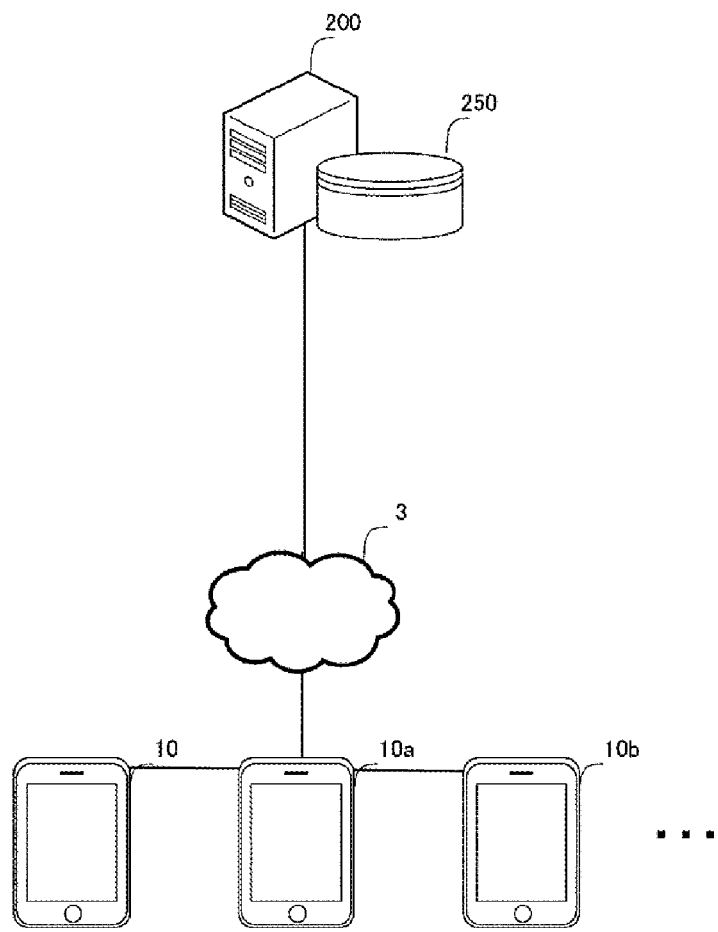
FIG. 2 is an overall composition view illustrating the security setting suggestion system 1.

FIG. 2 is an overall composition view illustrating the security setting suggestion system 1. The security setting suggestion system 1 is composed of multiple user terminals 10 and a security setting suggestion server 200. The user terminals 10 are in communication connection to the security setting suggestion server 200 through a public line network 3. The user terminals 10 do not need to communicate with each other.

The user terminal 10 may be a general information terminal used by a user, which is an information device or an electric appliance having functions described below. The user terminal 10 may be, for example, a network device or computer such as a mobile phone, a smartphone, a composite printer, a television, a router, or a gateway; or may be a domestic appliance such as a refrigerator or a washing machine; or may be a general information appliance such as a telephone set, a netbook terminal, a tablet terminal, an electronic book terminal, an electronic dictionary terminal, a portable music player, or a portable content reproduction/recording player.

The security setting suggestion server 200 is a server for performing the suggestion of security sets, is provided with a security set statistics database 250 in a storage section, and is an information device or an electric appliance having functions described below.

[Description of Functions]

Figure 3:
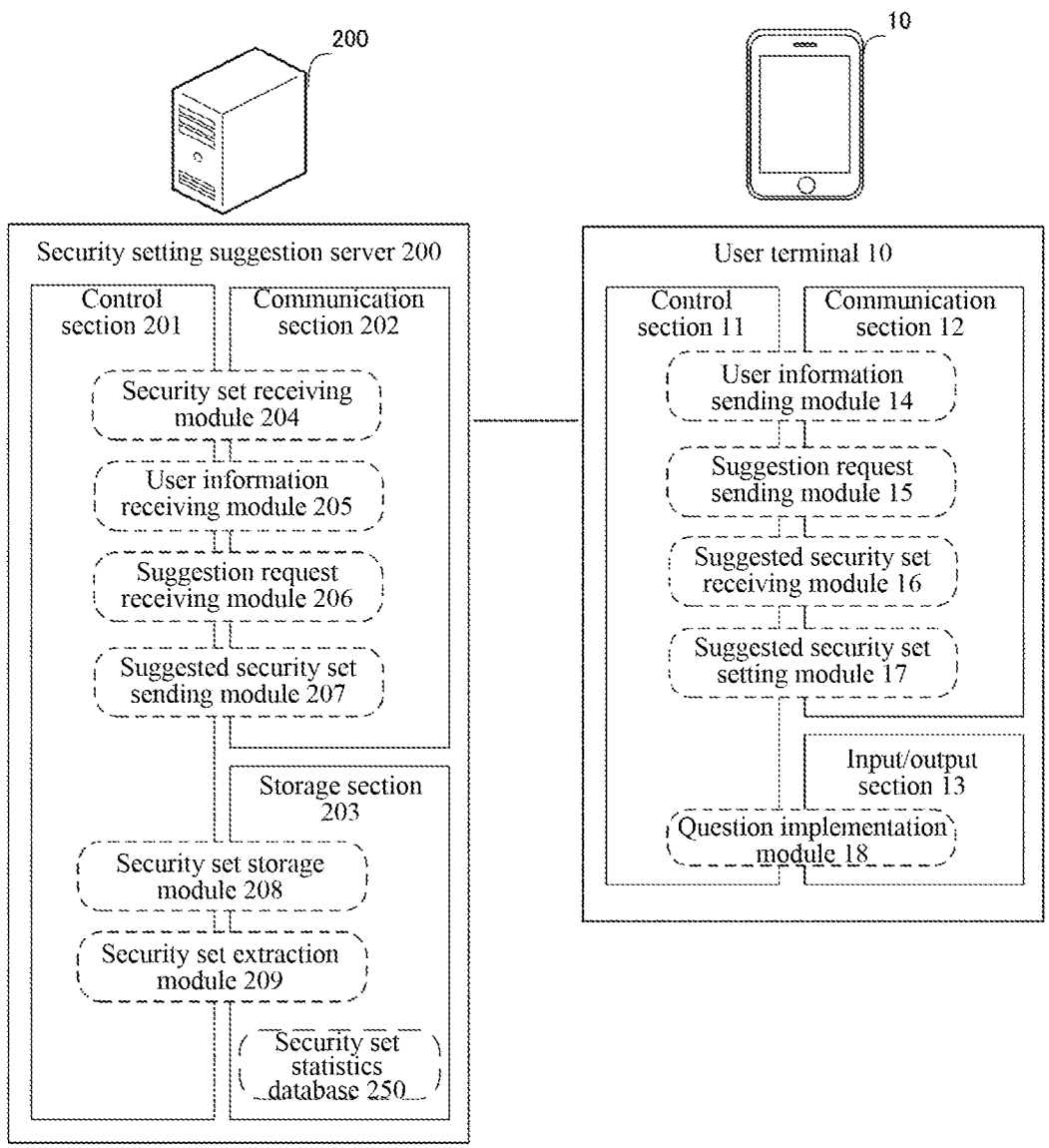
FIG. 3 is a view illustrating function blocks of a user terminal 10 and a security setting suggestion server 200 and relationships of the functions.

FIG. 3 is a view illustrating function blocks of a user terminal 10 and a security setting suggestion server 200 and relationships of the functions.

In the terminal 10, a control section 11 is provided with a central processing unit (CPU), a random access memory (RAM), a read only memory (ROM), etc, and a communication section 12, for example, is provided with a wireless fidelity (WiFi) device based on the IEEE802.11 standards, or a wireless device based on the IMT-2000 standards such as a third generation mobile communication system (or may be based on wired Local Area Network (LAN) connection).

Further, in the user terminal 10, an input/output section 13 is provided with an output section which outputs and displays data, images and sounds controlled by the control section, and an input section which receives an input from the user, such as a touch panel, a keyboard, or a mouse.

In the user terminal 10, the control section 11 reads specific programs and cooperates with the communication section 12 to implement a user information sending module 14, a suggestion request sending module 15, a suggested security set receiving module 16, and a suggested security set setting module 17. In addition, in the user terminal 10, the control section 11 reads specific programs and cooperates with the input/output section 13 to implement a question implementation module 18.

Similarly, in the security setting suggestion server 200, a control section 201 is provided with a CPU, a RAM, a ROM, etc., and a communication section 202, for example, is provided with a WiFi device based on the IEEE802.11 standards (or a wired device). Further, in the security setting suggestion server 200, a storage section 203 is provided with a storage section used for storing data and composed of a hard disk or a semiconductor memory. The storage section 203 is provided with the security set statistics database 250 in the storage section.

The control section 201 of the security setting suggestion server 200 reads specific programs and cooperates with the communication section 202 to implement a security set receiving module 204, a user information receiving module 205, a suggestion request receiving module 206 and a suggested security set sending module 207. In addition, the control section 201 of the security setting suggestion server 200 reads specific programs and cooperates with the storage section 203 to implement a security set storage module 208 and a security set extraction module 209.

[Security Setting Suggestion Processing]

Figure 4:
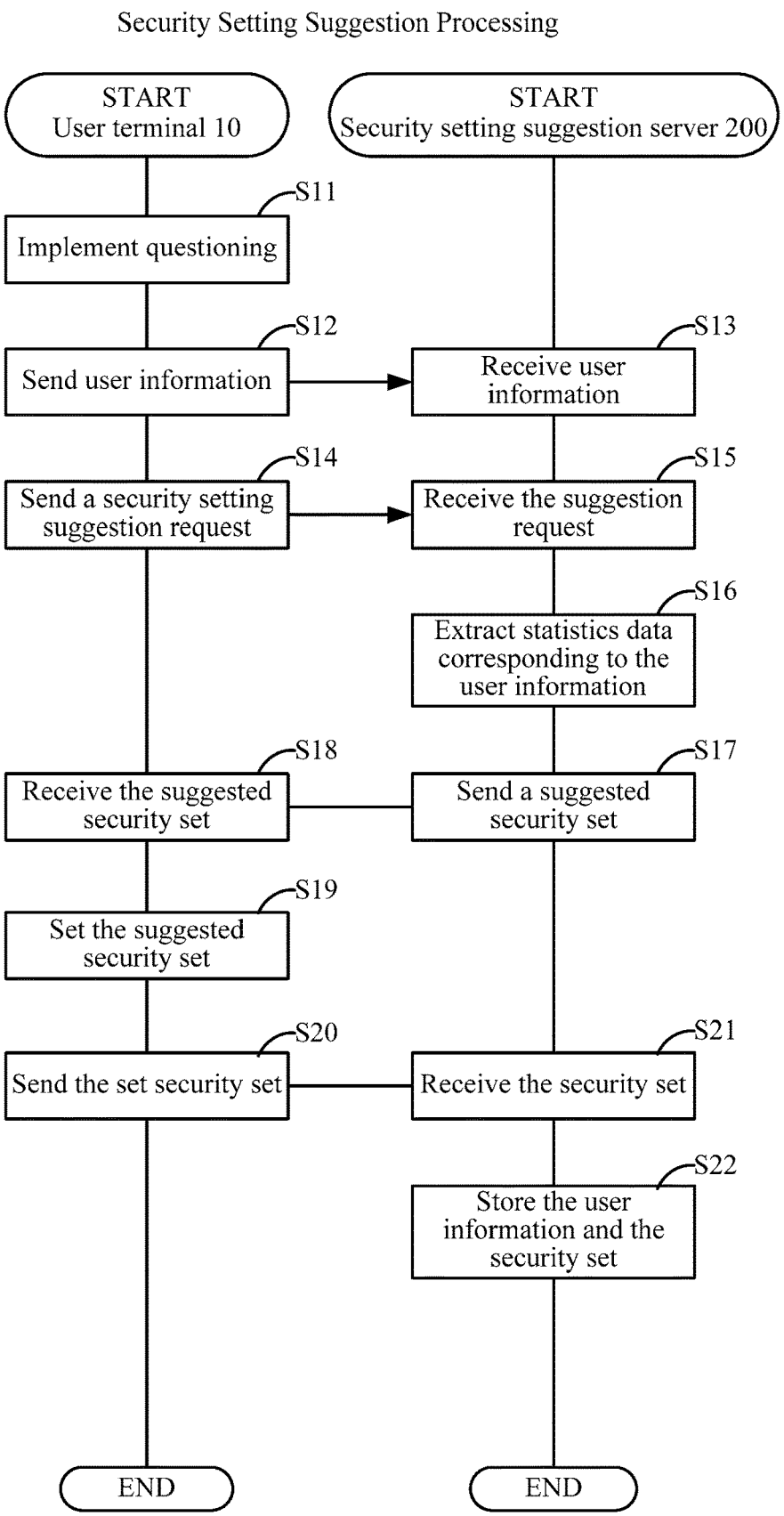
FIG. 4 is a flowchart of security setting suggestion processing executed by the user terminal 10 and the security setting suggestion server 200.

FIG. 4 is a flowchart of security setting suggestion processing executed by the user terminal 10 and the security setting suggestion server 200. Processing executed by modules of each of the above apparatuses will be described in conjunction with the security setting suggestion processing.

First, before receiving the suggestion of security sets, the question implementation module 18 of the user terminal 10 asks questions to the user based on specified question items (step S11). The questioning is intended to receive the appropriate suggestion of security sets, that is, to acquire demography information of the user, to discuss security setting requests, or to measure user proficiency in the Internet and terminals. The specific question may be to ask whether there is a desire to limit Internet or a use history of the Internet.

Then, the user information sending module 14 of the user terminal 10 sends user information including information of the user himself and answers to the questions to the security setting suggestion server 200 (step S12), and the user information receiving module 205 of the security setting suggestion server 200 receives this information (step S13). The user information other than the question items is mainly statistical information, that is, demography information. Specifically, the information indicating the attribute of the user includes jot-related information (position, title, use time period, working years, etc.) of the user, which may be read from registration information of the user terminal 10, or may be acquired through questions similar to questions mentioned above.

The suggestion request sending module 15 of the user terminal 10 sends a security setting suggestion request (step S14), and the suggestion request receiving module 206 of the security setting suggestion server 200 receives this request (step S15).

The security set extraction module 209 of the security setting suggestion server 200 extracts a security set from the security set statistics database 250 according to the suggestion request and the received user information (step S16). Since the security set and the user information are associated and stored in the security set statistics database 250, security sets having identical or similar user information are extracted, and the respective numbers are counted to generate statistical data of the security set.

FIG. 6 illustrates an example of a security set table in the security setting statistics database 250. In the security set table, a combination of parameters constituting the security setting is a security set, and is stored together with a security set name. For example, according to FIG. 6, in Security Set A, the use time limit, the Internet limit, the mail limit and the GPS tracking are valid, but the telephone limit is invalid. These security set tables do not necessarily have to be different for each type of security software that performs security setting, but may be stored and shared as elements that can be superiorly conceptualized.

In addition, FIG. 7 illustrates an example of a security set statistics table in the security setting statistics database 250. In the security set statistics table, security sets and user information in use are associated with each other and stored. In the range shown in this table, in condition that security sets of users whose attributes are 1 to 3 are extracted, Security Set A is extracted. In addition, when security sets of users whose attributes are 4 to 5 are extracted, Security Set B is extracted. In addition, when security sets of users whose attributes are 10 to 12 are extracted, Security Set C is extracted. The attribute is obtained by measuring and numeralizing the above position, title, use time period, working years, etc. For example, a high numerical number is set for a user with a high position and title (for example, 1 is set for a new employee, 5 is set for a meddle manager, and 10 is set for an executive director). In addition, the title is also measured and numeralized as the position. Further, for a user who is supposed to use the user terminal 10 for a longer period of time than usual, such as in midnight or early morning, a high numerical number is set. Further, the numeralization is performed based on the number of the working years of the user. The attribute actually stored as the user information is one of the average, maximum or minimum values of these numerical values of a respective user. The higher numerical value of the attribute is, the looser the limit of the security setting is. It is to be noted that based on the job content of the respective user, the respective value may be weighted, and the value of the content set with the highest weighting is used as the numerical value of the attribute. Further, the numerical value may be measured based on other conditions, and the measurement result may be used as the numerical value of the attribute. Further, the limit in the security setting may be determined according to each numerical value instead of the magnitude of the numerical value of the attribute.

In addition, the condition of the extraction may be designated by the content of the question item included in the user information, or the value may have amplitude (range), to add similar information. For example, a range from the received attribute of the user minus 3 to plus 3 is extracted as similar information, or the extraction is performed by ignoring the Question Item A which does not have a large influence on a certain attribute, or similar information extraction is not performed on attributes of the user of a certain attribute, but performed on attributes of the user of an attribute within a specified range.

The suggested security set sending module 207 then sends the extracted security set to the user terminal 10 as the suggested security set (step S17). The suggested security set may be all extracted security sets, or may be obtained by processing and selection on the extracted security sets. For example, a security set that apparently contradicts the answer result of the question items may be excluded. For example, such security set may be that the Internet limit is invalid although it is requested. Further, the suggested security set may include multiple security sets, from which the user is allowed to select a format.

When the suggested security set receiving module 16 of the user terminal 10 receives the suggested security set (step S18), the suggested security set setting module 17 sets this suggested security set as the security set of the user terminal 10 (step S19).

Figure 5:
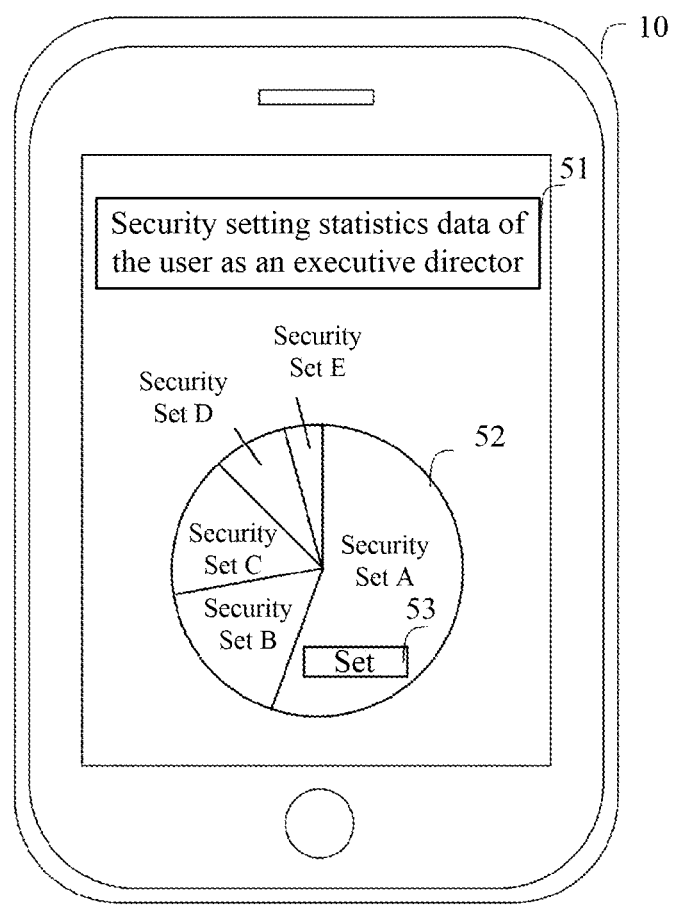
FIG. 5 illustrates an example of a picture on the user terminal 10 receiving a security setting suggestion.

FIG. 5 illustrates an example of a picture of the user terminal 10 receiving the suggested security set. Like demography information 51, the extraction condition of the statistical information is shown, and the statistical information 52 is shown below. With the setting button 53 pressed, the corresponding security set is set on the user terminal 10. In addition, the details of each item may be displayed once each item on the pie chart is touched, or the security set may be arbitrarily modified and then set.

The user terminal 10 then sends the content of the set security set to the security setting suggestion server (step S20). The security setting receiving module 204 of the security setting suggestion server 200 receives the content (step S21).

Finally, the security set storage module 208 of the security setting suggestion server 200 associates the received security set with the user information received in step S13, and stores them in the security set statistics database 250 (step S21). In this way, statistical information available in the next suggestion request is increased.

The above units and functions are implemented by reading and executing a specified program by a computer (including a CPU, an information processing apparatus and various terminals). The program is provided, for example, in the form of being provided by a computer via a network (i.e., software-as-a-service (SaaS)). The program is provided in the form of being recorded on a computer-readable recording medium such as a floppy disk, a compact disk (CD) (such as a compact disc read-only memory (CD-ROM)), and a digital versatile disc (DVD) (such as a digital versatile disc read-only memory (DVD-ROM) and a digital versatile disc random access memory (DVD-RAM)). In this case, the computer reads the program from the recording medium and transfers the programs to an internal storage device or an external storage device for storage and execution. Further, the program may also be previously recorded on a storage apparatus (recording medium) such as a magnetic disk, an optical disk or a magneto-optical disk, and provided from the storage apparatus for the computer via a communication line.

The embodiments of the present disclosure have been described above, but the present disclosure is not limited to the above-mentioned embodiments. In addition, the effects described in the embodiments of the present disclosure are merely illustrative of the best effects produced by the present disclosure, and the effects of the present disclosure are not limited to the effects described in the embodiments of the present disclosure.

REFERENCE LIST

1: security setting suggestion system
3: public line network
10: user terminal
200: security setting suggestion server
250: security set statistics database.

What is claimed is:

1. A computer system, arranged in communication connection to at least one user terminal, and provided with a security statistics database, wherein the computer system comprises:
a processor; and
a memory for storing instructions executable by the processor,
wherein when executing the instructions, the processor is configured to:
acquire, from a user terminal of the at least one user terminal, a suggestion request for a security set, and user information, wherein the user information comprising job-related information other than an identifier for determining a user serves as an attribute, wherein the attribute is obtained from evaluation and numeralization of the job-related information of the user of the user terminal including position, title, a time period of using the user terminal and working years;
extract, according to the suggestion request and the acquired user information, from the security set statistics database, a security set associated with user information which is identical to the acquired user information or similar to the acquired user information within a specific extent; and
provide the user terminal with at least one extracted security set as a suggested security set, wherein the at least one extracted security set is used as at least one proposal for the security set of the user terminal.

2. The computer system of claim 1, the processor is further configured to:
acquire, from the user terminal, a security set which is a combination of parameters related to a series of security settings in use;
acquire, from the user terminal, user information at least comprising an attribute and corresponding to a user currently using the acquired security set; and
store the acquired security set and the acquired user information, both which are associated with each other, in the security set statistics database.

3. The computer system of claim 1, wherein
the user information acquired from the user terminal comprises an answer implemented by a user for the user terminal to a specified question item.

4. A security setting suggestion method, executed by a computer system which comprises a processor and a memory and is in communication connection to at least one user terminal and is provided with a security statistics database, wherein the security setting suggestion method comprises:
acquiring, from a user terminal of the at least one user terminal, a suggestion request for a security set, and user information, wherein the user information comprising job-related information other than an identifier for determining a user serves as an attribute, wherein the attribute is obtained from evaluation and numeralization of the job-related information of the user of the user terminal including position, title, a time period of using the user terminal and working years;

extracting, according to the suggestion request and the acquired user information, from the security set statistics database, a security set associated with user information which is identical to the acquired user information or similar to the acquired user information within a specific extent; and providing the user terminal with at least one extracted security set as a suggested security set wherein the at least one extracted security set is used as at least one proposal for the security set of the user terminal.

5. A non-transitory computer-readable storage medium having a program stored thereon, wherein the program, when executed by a processor, implements the following steps:

acquiring, from the user terminal, a suggestion request for a security set, and user information, wherein the user information comprising job-related information other than an identifier for determining a user serves as an attribute, wherein the attribute is obtained from evaluation and numeralization of the job-related information of the user of the user terminal including position, title, a time period of using the user terminal and working years;

extracting, according to the suggestion request and the acquired user information, from the security set statistics database, a security set associated with user information which is identical to the acquired user information or similar to the acquired user information within a specific extent; and providing the user terminal with at least one extracted security set as a suggested security set wherein the at least one extracted security set is used as at least one proposal for the security set of the user terminal.

* * * * *